United States Patent
Geffen et al.

(10) Patent No.: US 10,682,761 B2
(45) Date of Patent: Jun. 16, 2020

(54) SYSTEM AND METHOD FOR DETECTING AND FIXING ROBOTIC PROCESS AUTOMATION FAILURES

(71) Applicant: NICE LTD, Ra'anana (IL)

(72) Inventors: David Geffen, Givat Shmuel (IL); Lior Epstein, Kibbutz Ein Shemer (IL); Gal Tesler, Zihron Yaakov (IL)

(73) Assignee: NICE LTD, Ra'Anana (IL)

( * ) Notice: Subject to any disclaimer, the term of this patent is extended or adjusted under 35 U.S.C. 154(b) by 302 days.

(21) Appl. No.: 15/628,666

(22) Filed: Jun. 21, 2017

(65) Prior Publication Data
US 2018/0370033 A1    Dec. 27, 2018

(51) Int. Cl.
*G06F 9/46* (2006.01)
*G06F 11/07* (2006.01)
*G06N 20/00* (2019.01)
*B25J 9/16* (2006.01)
*G06F 16/00* (2019.01)

(52) U.S. Cl.
CPC .......... *B25J 9/1674* (2013.01); *B25J 9/1661* (2013.01); *G06F 11/07* (2013.01); *G06F 16/00* (2019.01)

(58) Field of Classification Search
CPC .. G06F 11/07; G06F 11/0706; G06F 11/0712; G06F 11/0715; G06F 11/0736; G06F 11/0745; G06F 11/0739; G06F 11/14; G06F 11/1402; G06F 11/1415; G06F 11/1441; G06F 11/142; G06F 11/1474; G06F 11/079; G06F 11/0793; G06F 11/3409; G06F 11/3414; G06F 11/3452; G06F 11/006; H04L 41/06; H04L 41/0631; H04L 41/069; H04L 41/0645; G06N 20/00
See application file for complete search history.

(56) References Cited

U.S. PATENT DOCUMENTS

| | | | | |
|---|---|---|---|---|
| 8,928,672 B2 * | 1/2015 | Corazza | ................... | G06T 13/40 345/418 |
| 2003/0105687 A1 * | 6/2003 | Bross | ................... | G06Q 40/123 705/31 |
| 2005/0114350 A1 * | 5/2005 | Rose | ...................... | G06F 3/0613 |
| 2005/0278302 A1 * | 12/2005 | Ritter | ................... | G06F 16/447 |
| 2008/0070495 A1 * | 3/2008 | Stricklen | ................. | H04W 8/22 455/3.01 |
| 2011/0239013 A1 * | 9/2011 | Muller | .................. | G06F 1/3221 713/320 |
| 2013/0047135 A1 * | 2/2013 | Joshi | ........................ | G06F 8/30 717/120 |
| 2014/0019975 A1 * | 1/2014 | Schmidt | ................. | G06Q 10/10 718/100 |

(Continued)

*Primary Examiner* — Emerson C Puente
*Assistant Examiner* — Zhi Chen
(74) *Attorney, Agent, or Firm* — Soroker Agmon Nordman

(57) ABSTRACT

A system and method for detecting and fixing robotic process automation failures, including collecting tasks from at least one client computerized device, processing the tasks via robotic process automation, collecting tasks that failed to complete per task type, recording successful execution steps per each of the failed tasks, evaluating the recorded successful execution steps with respect to the failed task types, and providing selected execution steps that best fix the failed tasks, thereby fixing the robotic process automation failures.

19 Claims, 7 Drawing Sheets

(56) References Cited

U.S. PATENT DOCUMENTS

| | | | |
|---|---|---|---|
| 2015/0120714 A1* | 4/2015 | Xu | G06F 16/24578 |
| | | | 707/723 |
| 2015/0312398 A1* | 10/2015 | Li | H04L 12/2829 |
| | | | 455/420 |
| 2016/0246667 A1* | 8/2016 | Kumar Rao | G06F 11/0793 |
| 2017/0091636 A1* | 3/2017 | Polyakov | G06Q 10/10 |
| 2018/0113742 A1* | 4/2018 | Chung | G06F 9/5005 |

* cited by examiner

SYSTEM AND METHOD FOR DETECTING AND FIXING ROBOTIC PROCESS AUTOMATION FAILURES

FIELD OF THE INVENTION

The present disclosure generally relates to automated processing, and more specifically to detecting and fixing failures in robotic process automation.

BACKGROUND

Automation has been an integral part of our daily lives for a while now, whether at work or at home. Automated processing may even be initiated by our washing machine, which may be able to weigh the cloths within it, and thereby determine the time period required to properly wash that amount of clothes.

Automated processing may also be incorporated in call centers, whether by replacing a human representative altogether, or by forwarding a client's request from the human call center representative to a robotic process automation unit, which may process the client's request and perform the required update or change per the client's request.

SUMMARY

According to an aspect of some embodiments of the present invention there is provided a system for detecting and fixing robotic process automation failures including:
a task queue database configured to collect and store tasks from at least one client computerized device,
a robotic process automation unit configured to pull tasks from the task queue database for processing said tasks,
a failed tasks queue database configured to collect and store tasks and data on tasks that the robotic process automation unit failed to complete, and
a failure evaluation processor configured to collect the failed tasks per task type and to receive recordings of successful execution steps per each of the failed tasks, whereby the failure evaluation processor is further configured to evaluate the recorded successful execution steps with respect to the failed task types in order to provide selected execution steps that best fix the tasks that the robotic process automation unit failed to complete, thereby fixing the robotic process automation failures.

According to some embodiments, the system may further include a real-time database configured to store data on successfully completed tasks by the robotic process automation unit. In some embodiments, the data on successfully completed tasks comprises robotic process automation workflows per task type.

In some embodiments, the failure evaluation processor is configured to compare execution steps of the same task types. In some embodiments, the failure evaluation processor is further configured to aggregate the execution steps of the same task types in order to calculate percentage of commonalities between execution steps per type of task. In some embodiments, the failure evaluation processor may be configured to calculate a commonality score of the execution steps per type of task.

In some embodiments, the system further includes a robotic process control unit configured to receive data from the robotic process automation unit and from the failed tasks queue database. In some embodiments, the robotic process control unit is further configured to provide data on number of active tasks and number of processed tasks. In some embodiments, the robotic process control unit is further configured to provide data on percentage of completed tasks, and percentage of failed tasks.

According to another aspect of some embodiments of the present invention there is provided a method for detecting and fixing robotic process automation failures including:
collecting tasks from at least one client computerized device,
processing the tasks via robotic process automation,
collecting tasks that failed to complete per task type,
recording successful execution steps per each of the failed tasks,
evaluating the recorded successful execution steps with respect to the failed task types, and
providing selected execution steps that best fix the failed tasks, thereby fixing the robotic process automation failures.

In some embodiments, the method further includes storing data on successfully completed tasks by robotic process automation. In some embodiments, the data on successfully completed tasks comprises robotic process automation workflows per task type.

In some embodiments, the method further includes comparing successful execution steps of the same task types.

According to some embodiments, the method further includes calculating percentage of commonalities between the execution steps per each type of task.

In some embodiments, the method further includes providing data on number of active tasks and number of processed tasks.

In some embodiments, the method further includes providing data on percentage of completed tasks, and percentage of failed tasks.

BRIEF DESCRIPTION OF THE DRAWINGS

Some non-limiting exemplary embodiments or features of the disclosed subject matter are illustrated in the following drawings.

In the drawings.

Figure 1:
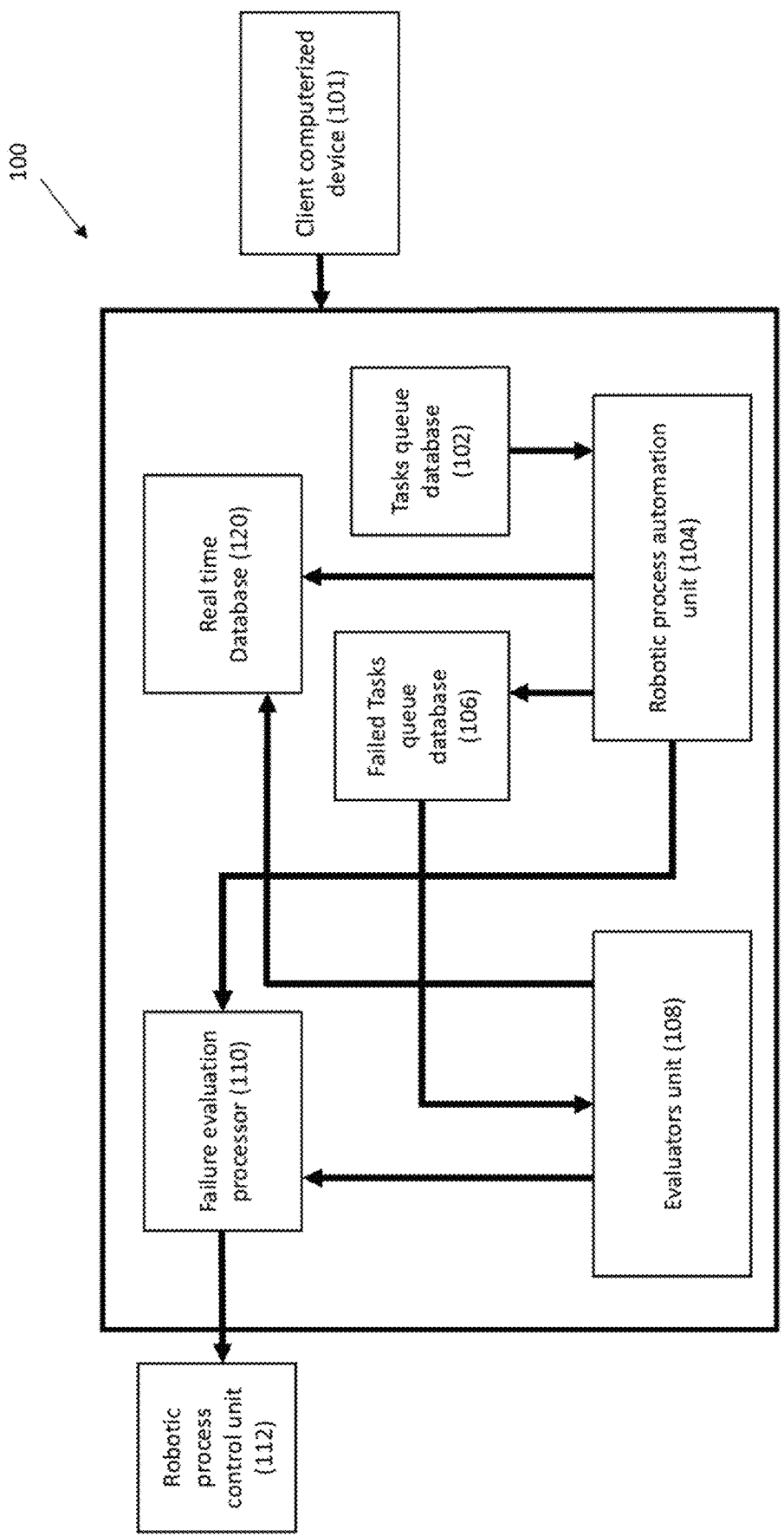
FIG. 1 is a schematic illustration of a system for detecting and fixing robotic process automation failures, according to some embodiments of the present invention.

With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Identical or duplicate or equivalent or similar structures, elements, or parts that appear in one or more drawings are generally labeled with the same reference numeral, optionally with an additional letter or letters to distinguish between similar entities or variants of entities, and may not be repeatedly labeled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Some embodiments of the present invention provide a system and method for detecting and fixing robotic process automation failures. Nowadays, in automated systems, e.g., in automated call centers, automated processing may either assist human representatives or may replace human representatives altogether, for performing various tasks, such as cancel a user's account, change user details, e.g., billing address, etc.

One technical problem dealt by the disclosed subject matter is changes that have been made to a process without informing or updating the automated processing unit accordingly. For example, a change in process may comprise an additional step that was not part of the initial process or removal of a step that appeared in the initial process but is no longer part of the updated process. In other instances, there may be a change in one or more of the screens, which the automated processing unit is designed to pass through and perform various actions thereon. A change to a screen may comprise change of location and/or order of tabs or icons along the screen, or addition and/or removal of tabs or icons from a screen, etc. That is, any change in the appearance of a screen that the automated processing unit is intended to open and perform any action thereto, and/or any change to the flow of a process that the automated processing unit is intended to accomplish, may interfere and cause failure to the automated processing unit's proper operation.

Current systems may detect that there is a failure in the operation of an automated processing unit, however, the nature of the failure and reason for the failure may not be determined with current systems.

One technical solution according to the disclosed subject matter is determining where a process or task had failed, suggesting a new process to fix such a failure, and incorporating a new and updated process according to which the automated processing unit would operate, in order to avoid future similar failures.

As used herein the term "client computer" or "client computerized device" refers to a computer and/or a computerized device such a smartphone or tablet computer, that is externally linked and/or is linkable to a system such as to a component of the system. For example, the client computer is linkable to the system by a communication facility or facilities, such as by a network as the internet, or a wireless or a telephonic mobile communication or any method of communication or a combination of communication methods. In the context of the present disclosure, unless otherwise stated, the term 'connect' and variations thereof refer to linking by way of a communication facility or facilities.

As used herein, the term "tasks queue database" refers to a database that is configured to store tasks to be accomplished by an automated processing unit. The tasks may be received from any third party system, e.g., a client computer, via a dedicated application. With respect to call center systems, the tasks may be received by the tasks queue database via an actual phone call initiated by a client or user, who wish to communicate with the call center system.

As used herein, the term "failed tasks queue database" refers to a database that is configured to store tasks that the automated processing unit failed to accomplish. An automated process control unit may determine the reason for each failure to accomplish a task.

As used herein, the term "commonality score" refers to a score that indicates how common an item being assigned with a commonality score is. For example, in case a transition or a pair of succeeding steps are assigned with a commonality score, the commonality score indicates how common this transition (or pair of succeeding steps) is with respect to other transitions, per task type. A high commonality score assigned to a transition (or step couple) may indicate that the transition appeared in many if not most of the successful execution steps per failed task type.

Some embodiments of the present invention may include a system, a method, and/or a computer program product. The computer program product may include a tangible non-transitory computer readable storage medium (or media) having computer readable program instructions thereon for causing a processor to carry out aspects of the present invention. Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including any object oriented programming language and/or conventional procedural programming languages.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Reference is now made to FIG. 1, which is a schematic illustration of a system for detecting and fixing robotic process automation failures, according to some embodiments of the present invention. System 100 may comprise a tasks queue database 102, which may be configured to receive and store tasks from any client computer device 101. That is, a user may file a request to system 100 to accomplish a certain task by system 100, which may be stored in task queue database 102. In some embodiments, tasks queue database 102 may be located on a server. According to some embodiments, system 100 may further comprise an automated processing unit or robotic processing automation unit 104. Robotic process automation unit 104 may be configured to pull tasks from tasks queue database 102, in order to attempt to accomplish or complete the pulled tasks. In some embodiments, the tasks may be pulled by robotic processing automation unit 104 according to a first-in-first-out (FIFO) order. Whereas, in other embodiments, the tasks may be pulled according to a different order, e.g., according to some kind of predetermined urgency or importance scale, which may be predefined and incorporated as part of the operation of system 100.

In some embodiments, system 100 may further comprise a failed tasks queue database 106, which may be configured to collect and store tasks that robotic processing automation unit 104 was unable to complete, e.g., failed tasks. As explained above, there may be many reasons for failure to accomplish or complete a task received in system 100 by a third party. Thus, some of the tasks may not be completed by robotic processing automation unit 104, and are thus titled as 'failed tasks'. All failed tasks may be collected and stored by failed tasks queue database 106.

In some embodiments, system 100 may further comprise an evaluators unit 108, which may be configured to evaluate the failed tasks that are stored in failed tasks queue database 106. In some embodiments, evaluators unit 108 may actively pull or passively receive the failed tasks from failed tasks queue database 106 in order to determine the reason and nature of their failure. In some embodiments, evaluators unit 108 may comprise human operators who may review the failed tasks, locate where the process of completing the task was "broken", and did not continue to the next step of the task or process of completing the task. According to some embodiments, the evaluators in evaluators unit 108 may manually complete the incomplete or failed tasks in a step-by-step manner, while the successful manual execution steps that lead to the completion of the failed tasks may be recorded in real-time.

In some embodiments, system 100 may comprise a failure evaluation processor 110. Failure evaluation processor 110 may receive each of the recorded manually successfully executed steps per each failed task from the evaluators unit 108. In some embodiments, failure evaluation processor 110 may compare the recorded successful execution steps with the failed task types, and may evaluate the successful execution steps with respect to the failed tasks type in order to provide selected execution steps that best fix the tasks that the robotic process automation unit 104 failed to complete. In some embodiments, by determining the type of each of the failed tasks, and by determining the successful execution steps per each failed task, failure evaluation processor 110 may be configured to select the most suitable flow or path of successful execution steps per each of the failed tasks.

Figure 4:
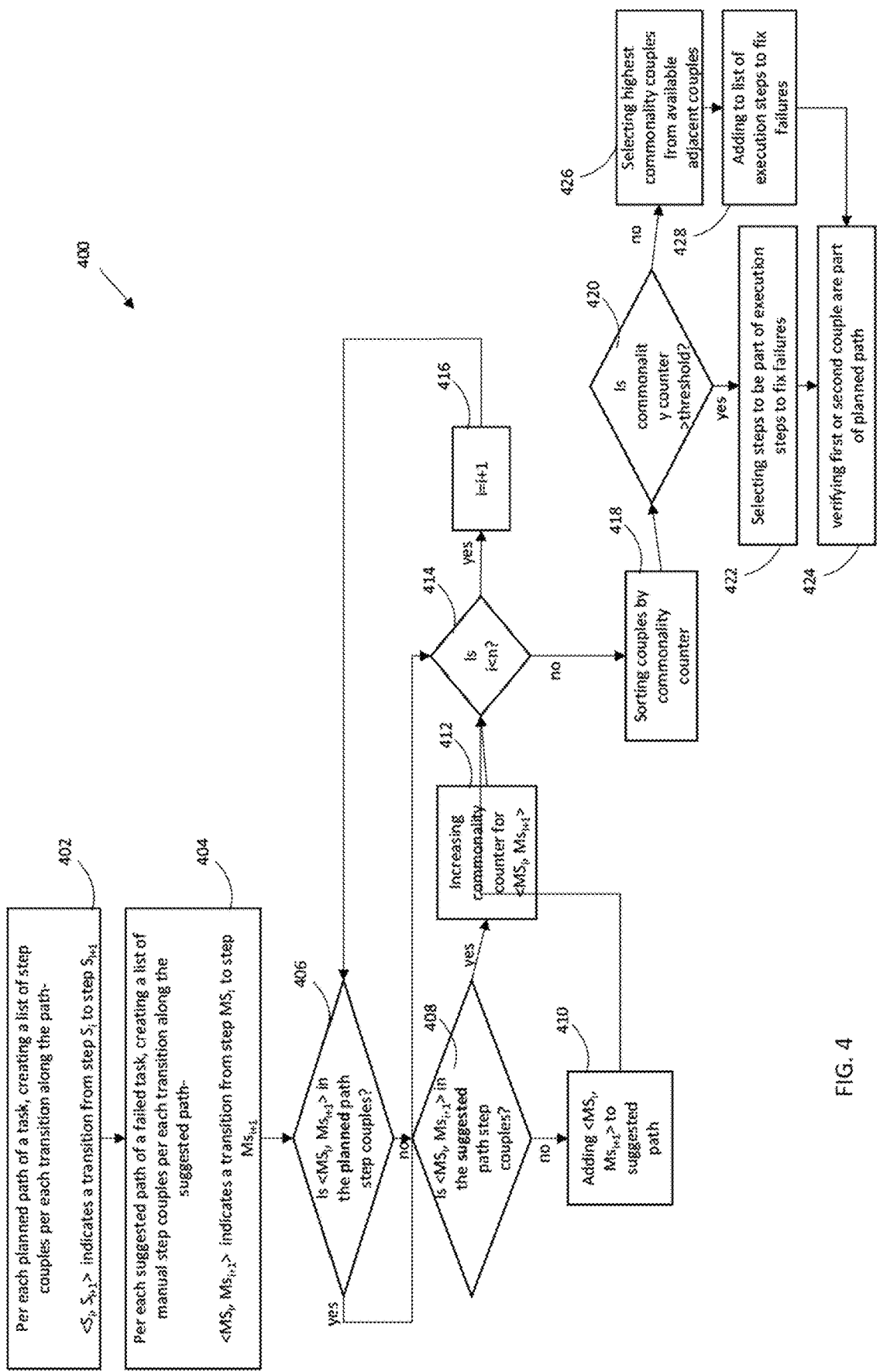
FIG. 4 is a schematic flowchart illustrating a method for processing and providing selected execution steps to fix robotic process automation failures.

As will be further detailed with respect to FIG. 4, according to some embodiments, between each two adjacent steps of a task or process, there may be defined a transition. If a process comprises moving from step A to step B, then the transition was complete. However, in case of a failure (e.g., due to a change in the process or in the screens operating the process), the process or task may not proceed from step A to step B, thus indicating a failure in the transition point between step A to step B. Failure evaluation processor 110 may be configured to run an examination on all transitions between each two adjacent steps in each of the failed tasks, and compare these transitions to each of the recorded successful execution steps. The failure evaluation processor 110 may detect the transitions that were the point of failure. According to some embodiments, the failure evaluation processor 110 may compare all the successful transitions to the failed, and from all the successful transitions select the ones with highest commonality score (e.g., transitions that are most common and which appeared in most successful execution steps per failed task type). These steps of high commonality score, which together create a new path, would be defined as the new execution steps according to which robotic process automation unit 104 is to complete or accomplish similar tasks pulled from task queue database 102.

According to some embodiments, the selected path of new successful steps selected and provided by failure evaluation processor 110, may be delivered to robotic process control unit 112. Robotic process control unit 112 may be configured to send the selected path to robotic process automation unit 104, in order to re-configure robotic process automation unit 104 to execute or complete tasks, which are similar to the previously failed tasks (and which may be pulled from task queue database 102) according to the updated new path of steps, as provided by failure evaluation processor 110.

According to some embodiments, system 100 may further comprise a real-time database 120, which may be configured to store tasks that were successfully executed by robotic process unit 104. In addition, real-time database 120 may be configured to store manually executed tasks, which were executed by evaluators unit 108. Any other data may further be stored by real-time database 120, for later processing and analyzing.

Figure 2:
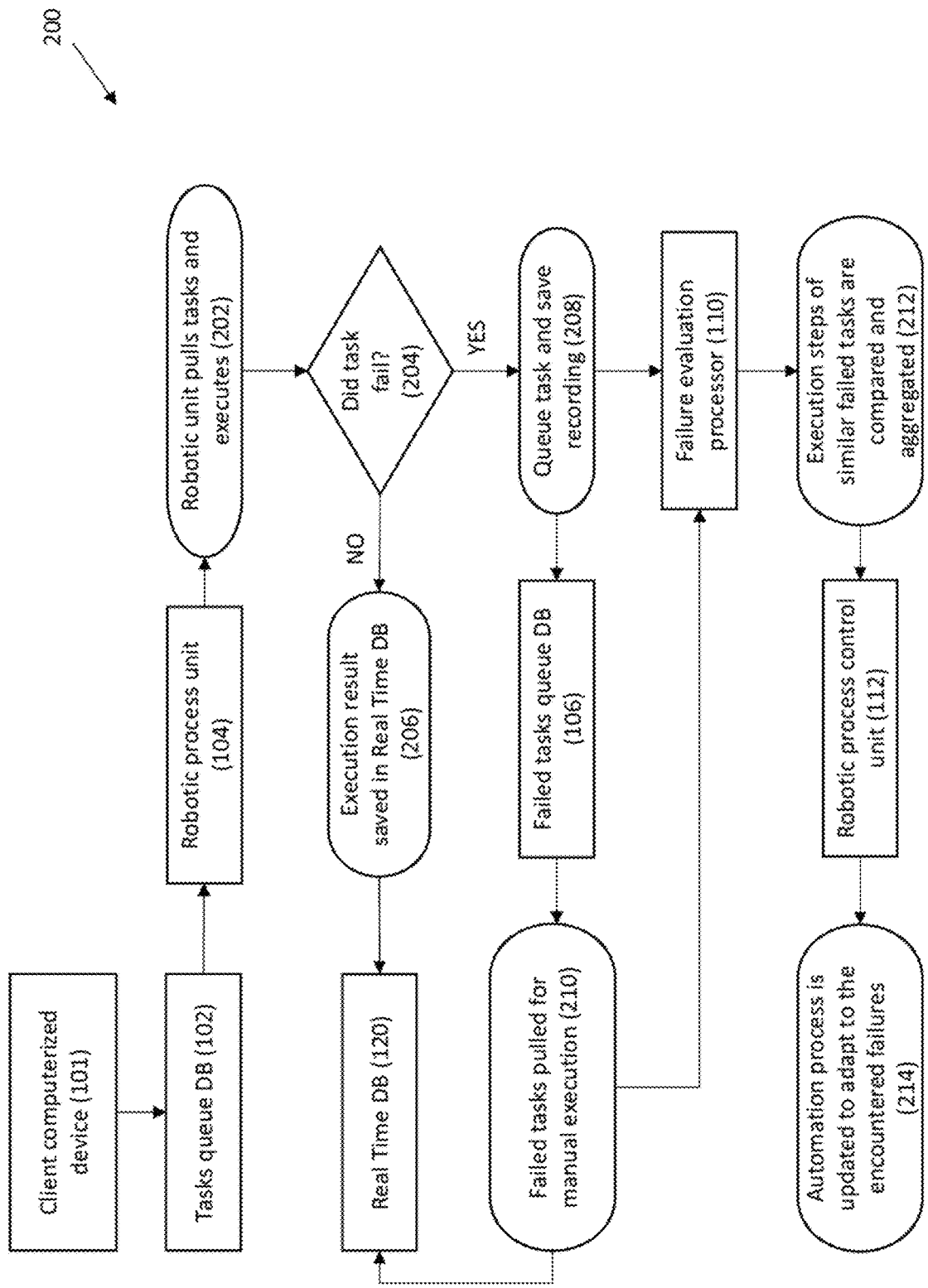
FIG. 2 is a schematic flowchart illustrating a system and operations performed by the system's units for detecting and fixing robotic process automation failures, according to some embodiments of the present invention.

Reference is now made to FIG. 2, which is a schematic flowchart 200 illustrating a system and operations performed by the system's units for detecting and fixing robotic process automation failures, according to some embodiments of the present invention. In some embodiments, client computer 101 may send a request to system 100 to complete a task. The requested task may be stored by task queue database 102. According to operation 202, the robotic process unit 104 may be configured to pull tasks from task queue database 102 and execute these tasks. The order in which robotic process unit 104 pulls the tasks may be predefined by system 100. In some embodiments, it may be by a FIFO order, though any other order of pulling of tasks in order to complete (or attempt to complete) them, may be implemented.

After a task is pulled by robotic process unit 104, and after a task is executed by robotic process unit 104, it may be determined, according to operation 204, whether the task failed. That is, it should be determined whether execution of the task had completed by robotic process unit 104 or whether the execution of the task by robotic process unit 104 had failed. Failure of execution of a task may be due to various reasons, among which, for example, may be non-reported changes to steps or to screens on which the steps to execute the task should be accomplished. In case a task had been successfully executed by robotic process unit 104, according to operation 206 the execution result may be saved in real-time database 120 (FIG. 1), for possible later processing and analyzing. However, in case a task had failed to fully execute, according to operation 208, the failed task is queued and its recordings are saved by failed task queue database 106.

According to operation 210, the failed tasks may be pulled for manual execution, e.g., by evaluators unit 108. The manual execution of the failed tasks may be recorded and store in real time database 120. In addition, failed tasks as well as their manual execution (of operation 210) may be transferred to failure evaluation processor 110. According to operation 212, failure evaluation processor 110 may compare execution steps of similar failed tasks, and a commonality score may be calculated per each of the manual successfully executed steps. The steps of highest commonality score or of a commonality score that is above a pre-defined threshold may be selected as the steps that would replace the steps causing the task execution to fail.

According to some embodiments, the selected steps that together form a new and successful path per each failed task may be transferred to robotic process control unit 112. In some embodiments, robotic process control unit 112 may update the automation process in order to adapt the process such to overcome the encountered failures. The updated automation process may be published to robotic process unit 104 in order to prevent future failures similar to the ones encountered thus far.

Figure 3:
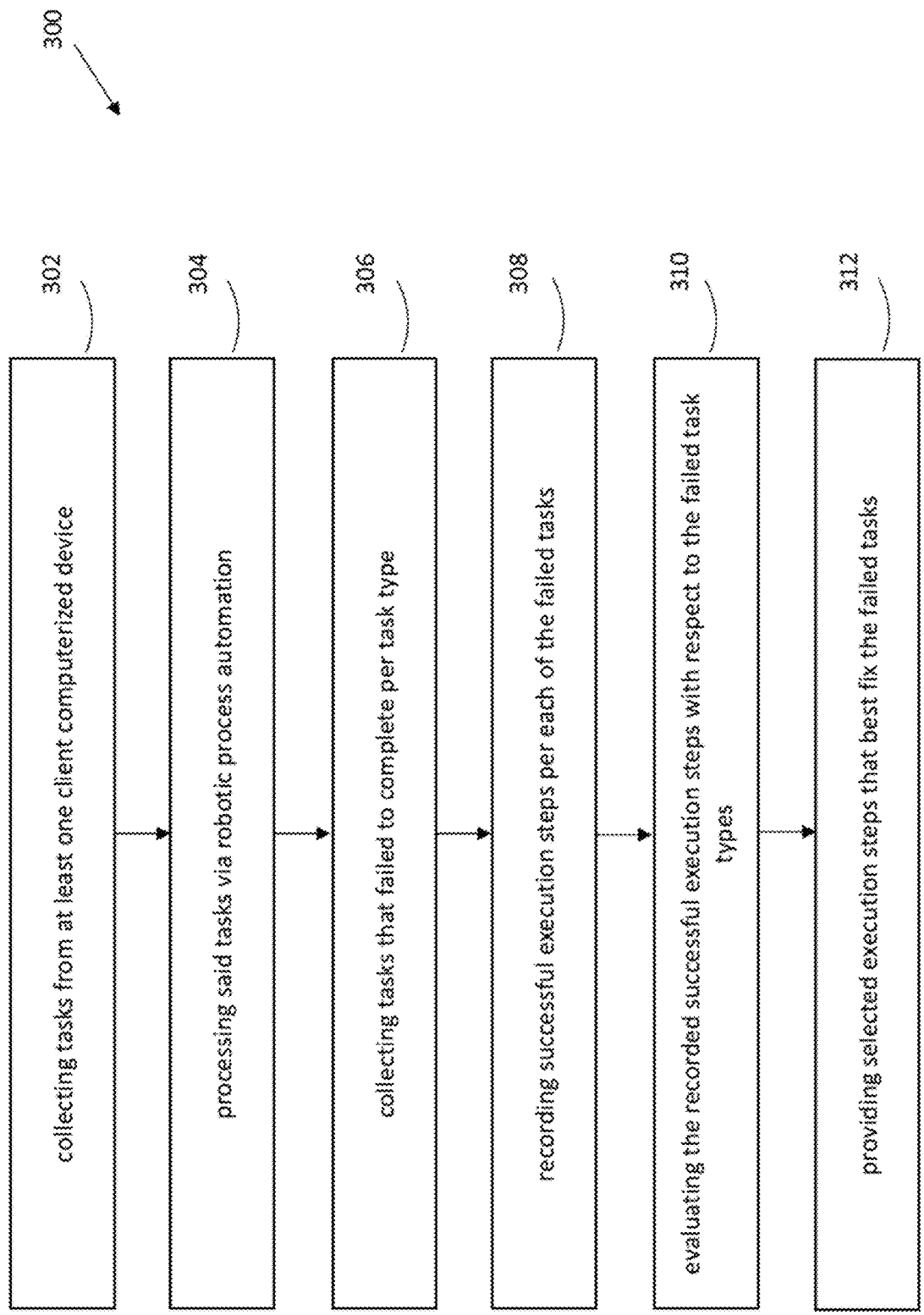
FIG. 3 is a schematic flowchart illustrating a method for detecting and fixing robotic process automation failures, according to some embodiments of the present invention.

Reference is now made to FIG. 3, which is a schematic flowchart illustrating a method for detecting and fixing robotic process automation failures, according to some embodiments of the present invention. According to some embodiments, method 300 may comprise operation 302, which may comprise collecting tasks from at least one client computerized device, e.g., client computer 101. The tasks may be stored by tasks queue database 102. Tasks may be collected from various clients, via applications that are installed onto the clients' computers, or via a phone call initiated by clients to system 100, e.g., to a call center.

In some embodiments, operation 304 may comprise processing the tasks via robotic process automation, e.g., robotic process automation unit 104. Processing the tasks may comprise executing the tasks according to a pre-configured or planned path, which comprises specific steps in order to accomplish and complete (or attempt to complete) the task. In some embodiments, some of the tasks may fail to properly complete due to various reasons, e.g., due to additions or removal of steps from an initial process according to which robotic process automation unit 104 was programmed to complete a currently failed task. Thus, operation 306 may comprise collecting the failed tasks per task type, for later processing. The failed tasks may be collected and stored by failed tasks queue database 106.

In some embodiments, method 300 may further comprise operation 308, which may comprise recording successful execution steps per each of the failed tasks. In some embodiments, manual execution may take place by evaluators unit 108. The evaluators may manually perform various steps in order to manually execute the failed task to reach completion. These successful execution steps may be recorded during performance by the evaluators unit 108. In some embodiments, method 300 may comprise an operation which may comprise storing the recorded successfully executed steps. Storing of the successfully executed steps may be done by real-time database 120, or by failure evaluation processor 110.

According to some embodiments, method 300 may further comprise operation 310, which may comprise evaluating the recorded successful execution steps with respect to the failed tasks types. In some embodiments, operation 310 may be performed by failure evaluation processor 110. Failure evaluation processor 110 may evaluate the recordings of the successful execution steps by calculating a commonality score per each pair of steps, whereby the commonality score indicates how common each pair of steps is, among all recordings of successful execution steps per failed task type. The pairs of steps which are part of the successful execution path assigned with the highest commonality score, or with a commonality score that is higher than a predetermined threshold, may be selected as steps to be included as part of the updated and correct execution path.

In some embodiments, method 300 may comprise operation 312, which may comprise providing the selected execution steps that best fix the failed tasks. For example, the execution steps that best fix the failed task, are those assigned with the highest commonality score or those assigned with a commonality score that is higher than the predetermined threshold. Adjacent pairs of such successful and highly commonality scored steps per failed task type, are gathered according to the appropriate order of execution, thereby creating a new and up-to-date execution path for completing a failed task per each failed task type. The selected execution steps that best fix the failed tasks may be transferred to robotic process control unit 112. Robotic process control unit 112 may translate these steps into robotic automation solution, which may then be published to robotic process automation unit 104.

According to some embodiments, method 300 may comprise the step of storing data on successfully completed tasks by robotic process automation. For example, tasks that were successfully completed by robotic process automation, may be stored by a database, e.g., real-time database 120. In some embodiments, the data related to successfully completed tasks comprises robotic process automation workflows per task type. That is, the data relating to successfully completed tasks may comprise data on workflows or task path that have been completed per each task type.

According to some embodiments, following operation 308 of recording successful execution steps per each failed task, method 300 may comprise an operation comprising comparing successful execution steps of the same task types. In some embodiments, successful execution steps per each task type may be compared in order to enable processing and evaluation of these successful execution steps, per type of task, such to determine and select the execution steps that best fix the initially failed tasks.

In some embodiments, method 300 may comprise an additional operation, typically following operation 310, which may comprise calculating a percentage of commonalities between the execution steps per each type of task. As mentioned above, a commonality score indicates how common a certain transition between two steps is, with respect to the entire recorded successfully competed tasks, per type of task. The higher the commonality score per successful transition between two succeeding steps, the more likely that this transition should replace a non-successful transition, per the same task type.

In some embodiments, method 300 may further comprise an operation, which may comprise providing data on the number of active tasks and the number of processed tasks, or on the percentage of the active and/or processed tasks per the total tasks received by system 100. System 100, and more specifically robotic process control unit 112, may be configured to calculate the precise numbers of active and/or processed tasks handled by system 100. In some embodiments, robotic process control unit 112 may be configured to calculate the percentage of such tasks with respect to the total tasks received by system 100. The data on the number of percentage of active and/or processed tasks may be displayed on a display device, which may be part of system 100.

According to some embodiments, method 300 may further comprise an operation, which may comprise providing data on percentage of completed tasks, and percentage of failed tasks. In some embodiments, robotic process control unit 112 may be configured to calculate and provide data on the percentage of completed and/or failed tasks with respect to the total number of tasks that system 100 is to process and complete. The data of percentage of completed and/or failed tasks may be displayed on a display device, which may be included in system 100.

References is now made to FIG. 4, which is a schematic flowchart illustrating a method for processing and providing selected execution steps to fix robotic process automation failures. In some embodiments, method 400 may illustrate the detailed operations for processing and selecting execution steps that fix robotic process automation failures. Specifically, method 400 may provide details with respect to the more general method 300 (FIG. 3).

In some embodiments, method 400 may comprise operation 402, which may comprise creating a list of step couples per each transition along the path, per each planned path of a task. For example, $<S_i, S_{i+1}>$ denotes a transition occurs from step $S_i$ to step $S_{i+1}$. Operation 402 may comprise creating a list of couples of succeeding steps, whereby each two succeeding steps may indicate a transition from the first occurring step to the second occurring or proposedly occurring step. According to some embodiments, a path according to which a task is to be completed may comprise a list of such transitions, or couples of succeeding steps. Operation 402 may comprise creating a list of step couples per each planned path of a task. That is, each task has an initially planned path according to which robotic process automation unit 104 operates in order to complete the task. In case a task failed to complete, this would mean that a different path should be followed by robotic process automation unit 104.

In some embodiments, method 400 may comprise operation 404, which may comprise per each suggested path of a failed task, creating a list of manual step couples per each transition along the suggested path. That is, per each failed task, manual steps for successfully completing the failed task may be performed by and recorded by, for example, evaluators unit 108. Each failed task that was successfully manually executed may comprise a list of steps that comprise the successful execution steps. Each pair of successive steps indicates a transition from the first occurring step to a successive second occurring step. For example, $<MS_i, Ms_{i+1}>$ may indicate a transition from manual step $MS_i$ to manual step $Ms_{i+1}$.

According to operation 406, it may be determined whether transition $<MS_i, Ms_{i+1}>$ in part of the planned path step couples. If it is, then in operation 414, it may be determined whether indicator 'i' is smaller than 'n', that is, whether the examined step couples is the last in a list of step couples that form the total of step couples along the initially planned path, or whether there are other additional step couples along the initially planned path. If according to operation 414, there are more step couples, then in operation 416, indicator 'i' is increased by 1, and the new succeeding step couple creating the next transition is examined to determine whether they are part of the initially planned path, as per operation 406. However, in case, according to operation 406, transition $<MS_i, Ms_{i+1}>$ is not part of the initially planned path, in operation 408 it may be determined whether transition $<MS_i, Ms_{i+1}>$ is part of the step couples of the suggested path, whereby the suggested path may be the path manually executed by the evaluators unit 108. In case transition $<MS_i, Ms_{i+1}>$ is not part of the step couples of the suggested path, then according to operation 410, transition $<MS_i, Ms_{i+1}>$ may be added to the list of step couples of the suggested path. However, in case transition $<MS_i, Ms_{i+1}>$ is part of the step couples of the suggested path, then according to operation 412, the commonality counter is increased for transition $<MS_i, Ms_{i+1}>$. That is, in case transition $<MS_i, Ms_{i+1}>$ is part of the suggested path of successful manual execution steps, the commonality counter of transition $<MS_i, Ms_{i+1}>$ is increased such that the more common such a transition is among all suggested paths per similar task types, the higher the commonality score of the transition. A high commonality score may indicate that the transition having assigned such a high score should be included in the suggested path, whereby that transition would later be implemented as part of the updated robotic process automation for fixing previously encountered failures. Once commonality score of transition $<MS_i, Ms_{i+1}>$ is increased (according to operation 412), operation 414 may be applied. In operation 414 it may be determined whether indicator 'i' is smaller than 'n', that is, whether the examined step couples is the last in a list of step couples that form the total of step couples along the initially planned path (or along the suggested path), or whether there are other additional step couples along the initially planned path (or along the suggested path). If according to operation 414, there are more step couples, then in operation 416, indicator 'i' is increased by 1, and the new succeeding step couple creating the next transition is examined to determine whether they are part of the initially planned path, as per operation 406, and so on along the next operations, as detailed above.

In case indicator 'i' is not smaller than the total number of steps, i.e., in case the examined pair of steps form the last transition along the initially planned path or along the suggested path, then operation 418 may comprise sorting the pairs of steps that have already been assigned with a commonality score or commonality counter. Sorting the pairs of steps or transitions may be according to the value of the commonality counter, such that all transitions with the same value of commonality score may be grouped together, thereby creating groups of transitions with the same commonality score.

In some embodiments, the following operation may be operation 420, which may comprise determining whether the commonality counter (or score) is above a predetermined threshold. The predetermined threshold may, for example, be provided based on previous commonality counter statistics. If the commonality score or a certain transition is above the predetermined threshold, the operation 422 may comprise selecting the transition's pair of steps to be part of the execution steps that are to fix the robotic automation failures. In some embodiments, in order to ensure that the selected steps relate to the correct path, per a specific type of failed task, operation 424 may comprise verifying that at least a first step couple or a second step couple (or transition) are part of the planned path. Not all steps fail during the process of completing a task. For example, typically at least the first transition and occasionally the second transition are completed with no failures. Thus, in order to make sure that the selected step are indeed part of the correct execution path for correcting a specific failed task, it may be determined that at least the first or second transitions are also part of the planned path, per the specific failed task.

In some embodiments, in case the commonality score of a certain transition is below the predetermined threshold, operation 426 may comprise selecting the pair of steps assigned with the highest commonality score, among the available adjacent step couples. That is, if there is no pair of steps that has a commonality score higher than the threshold, the transition that would be selected to be part of the execution path to fix failures in the robotic automation may be the transition assigned with the highest commonality score. Accordingly, operation 428 may comprise adding the transition assigned with the highest commonality score to the list of execution steps to fix failures of the robotic automation. In this case, as well as in the case that the commonality score of the transition is above the predetermined threshold, an additional operation 424 may comprise verifying that at least a first step couple or a second step couple (or transition) are part of the planned path. That is, in order to make sure that the selected step are indeed part of the correct execution path for correcting a specific failed task, it may be determined that at least the first or second transitions are also part of the planned path, per a specific failed task.

Figure 5:
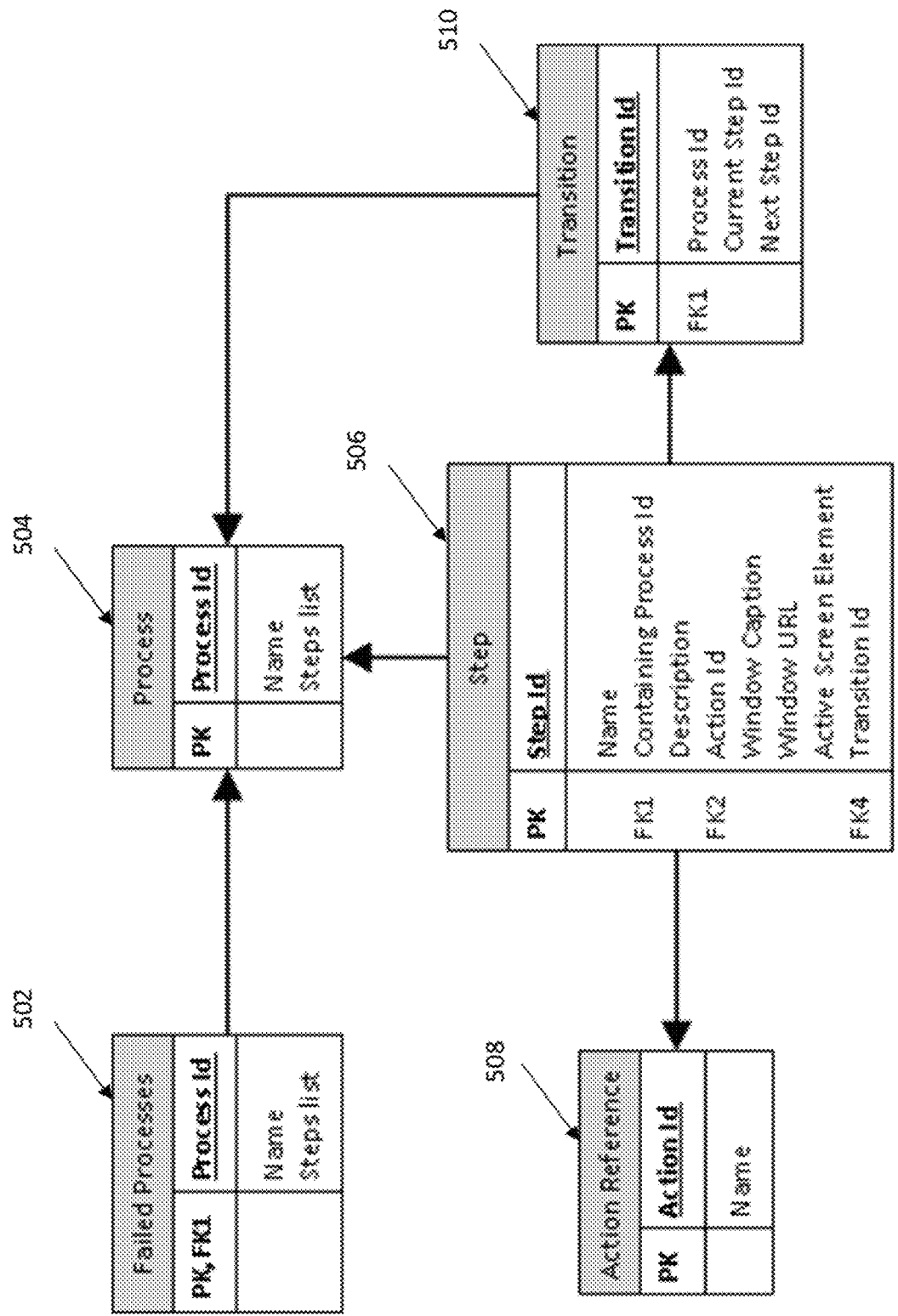
FIG. 5 is a schematic illustration of the relationship between steps, processes and actions for detecting and fixing robotic process automation failures, according to some embodiments of the present invention.

Reference is now made to FIG. 5, which is a schematic illustration of the relationship between steps, processes and actions for detecting and fixing robotic process automation failures, according to some embodiments of the present invention. Any of a process, failed process, step, transition, and action may comprise identification (ID) data. The identifying data may comprise the name, description, and any other identifying information per a specific type of item, e.g., as the items listed above. FIG. 5 schematically illustrates the relationship between the various items that are included as part of the robotic process automation failure fixing. For example, process 504 may comprise a process ID, which may comprise the name of the process and the list of steps that the process comprises. Similarly, failed process 502 may comprise a process ID, which may comprise the name of the process as well as the list of steps that were performed by the robotic automation unit 104 (FIG. 1). Failed process 502 may further comprise the step (or transition) which failed to complete by robotic automation unit 104, such to indicate where failure occurred during process of completing or attempting to complete a task.

In some embodiments, step 506 may comprise a step ID, which may comprise the step name, the step description, the action performed by the step, the window details onto which the action (and process) are performed, e.g., the window's caption, and the window's URL. In addition, the step ID may comprise the active screen element within the window, and a transition ID, which relates to the transition that the current step is a part of. In some embodiments, action 508 may comprise an action ID, which may comprise the name of the action. As mentioned with respect to step 506, the action 508 may be indicated with respect to the relevant step 506. According to some embodiments, an action 508 may comprise, for example, actions such as 'click', 'copy', 'paste', 'set text', etc.

In some embodiments, transition 510 may comprise a transition ID, which may comprise details on the process ID that the transition 510 is a part of. The transition ID may comprise further comprise the name of the current step ID and the next step ID, whereby the current and next step IDs define the transition 510, since a transition comprises two succeeding steps.

Figure 6:
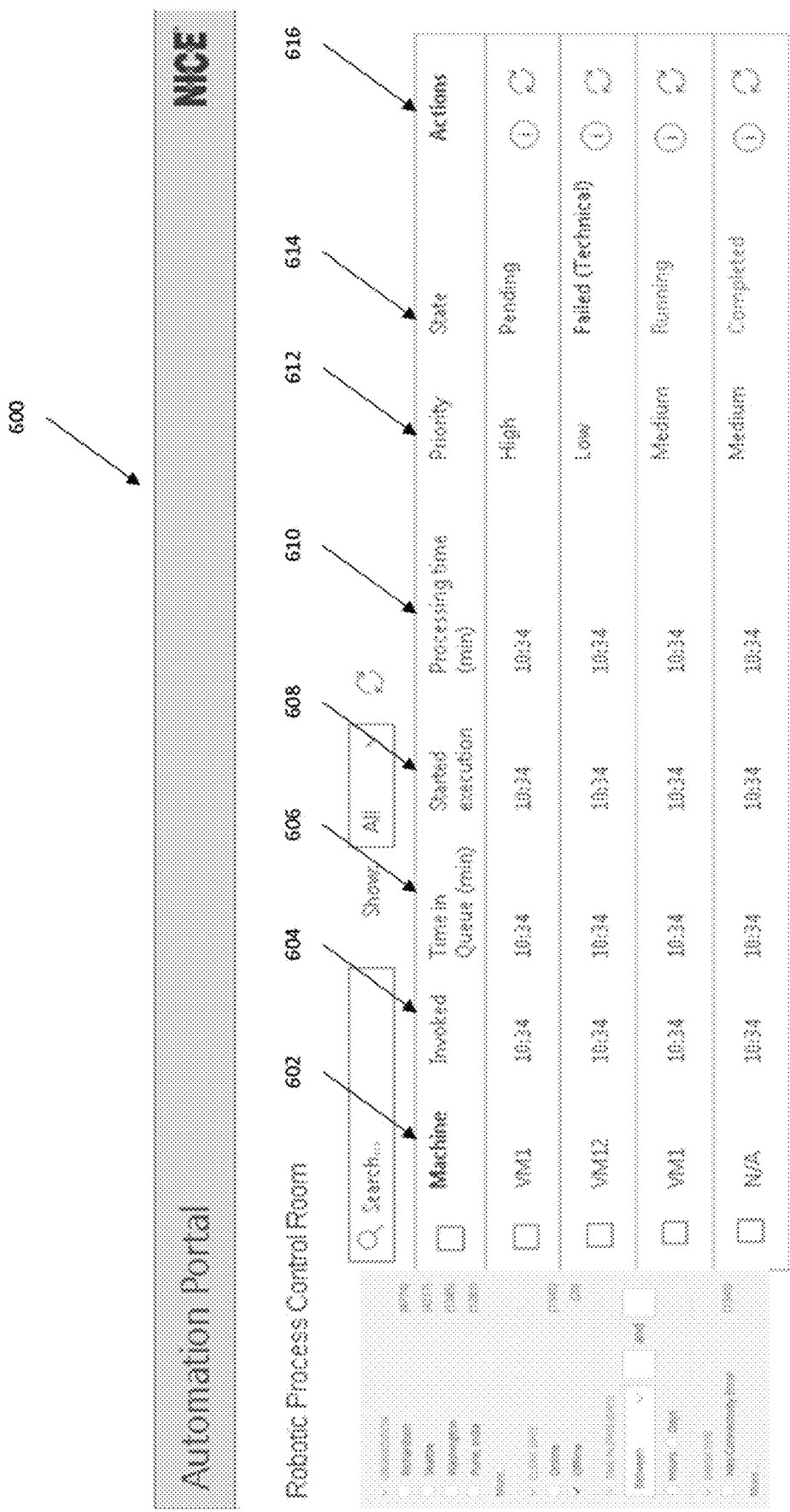
FIG. 6 is a schematic illustration of an example of a graphical user interface (GUI) illustrating a status report per each task.

Reference is now made to FIG. 6, which is a schematic illustration of an example of a graphical user interface (GUI) illustrating a status report per each task. In some embodiments, GUI 600 may illustrate the status of each task that is pulled by robotic process automation unit 104 (FIG. 1) from task queue database 102, and which is attempted to be completed by robotic process automation unit 104. GUI 600 may comprise several details per the status of each task processed by robotic process automation unit 104. For example, GUI 600 may comprise the name of the machine or device 602 from which each processed task is received. In some embodiments, GUI 600 may comprise the invoking time 604, which may indicate the time in which each task is invoked by machine 602. GUI 600 may further comprise queuing time 606, which may indicate the time at which each task is queued by task queue database 102. In some embodiments, GUI 600 may comprise the executing time 608, which may indicate the time at which execution (or attempt to complete) of a task takes place by robotic process automation unit 104.

In some embodiments, GUI 600 may further comprise processing time 610, which may indicate the time it may take to process each task. In some embodiments, any of the time related items may be calculated and displayed in minutes, seconds or any other time scale.

In some embodiments, GUI 600 may comprise the type of priority 612 of each task. Some tasks may be of high priority and should thus be processed and completed prior to other tasks of a lower or medium priority. Tasks of medium priority should be processed and completed prior to tasks of lower priority, though after tasks of high priority. GUI 600 may comprise state 614, which may indicate the status of each task, for example, whether the task is running, e.g., is still being processed, whether the task is completed, or whether the task failed. GUI 600 may comprise details on actions 616, which may be part of the process of processing and attempting to complete a task.

According to some embodiments, GUI 600 may provide a detailed report per each task, as to whether it has been completed, whether it is being processed or whether it failed, such that the failure evaluation processor 110 may receive the data per each task, in order to evaluate executed tasks with respect to failed tasks.

In some embodiments, GUI 600 may be displayed onto a display unit, which may be part of system 100. Display of the status of processes may be done via an 'Automation Portal', which may be a display in connection with robotic process control unit 112.

Figure 7:
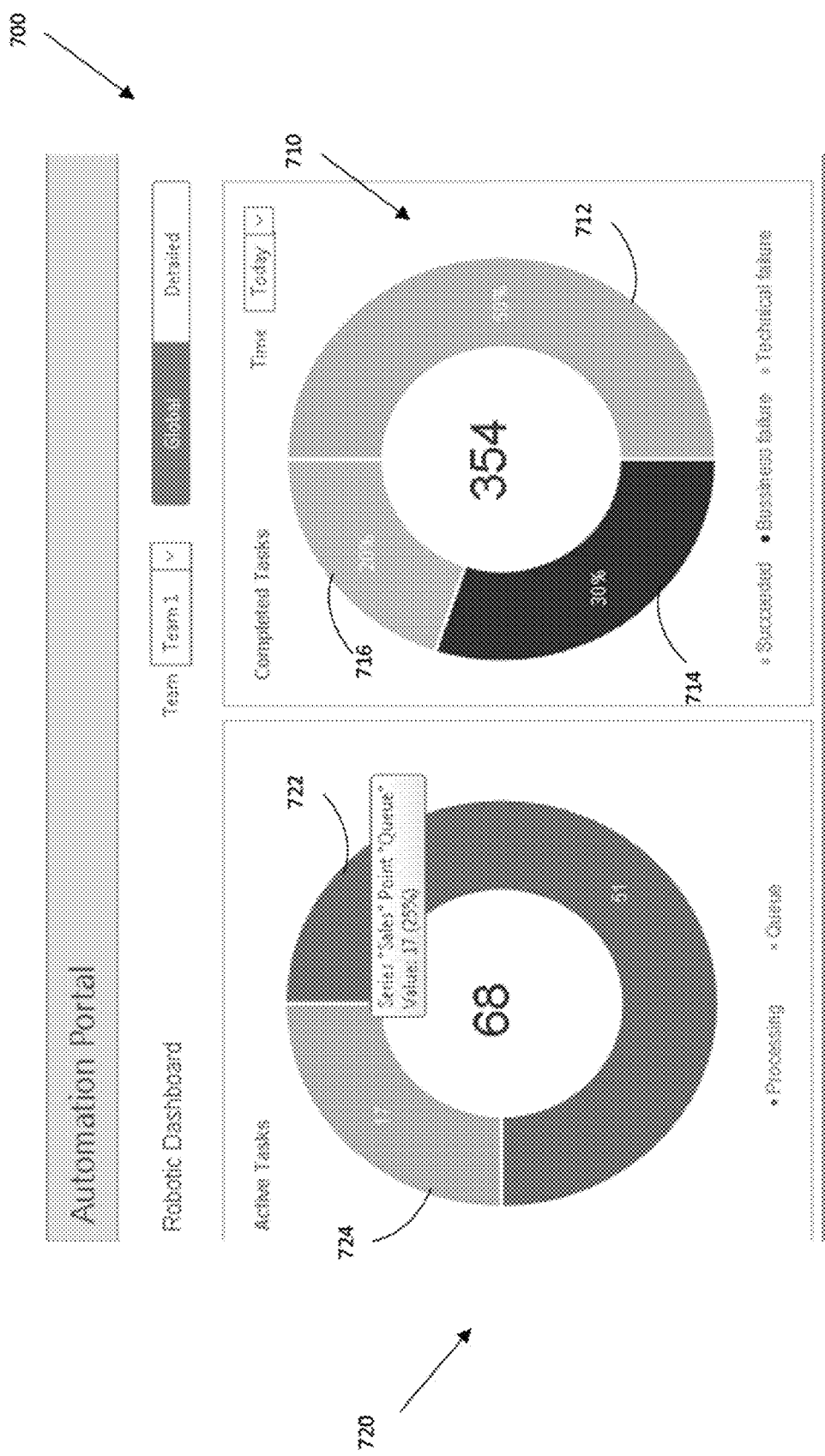
FIG. 7 is a schematic illustration of an example of a graphical user interface (GUI) so illustrating data on percentage of completed tasks, and percentage of failed tasks.

Reference is now made to FIG. 7, which is a schematic illustration of an example of a graphical user interface (GUI) illustrating data on percentage of completed tasks, and percentage of failed tasks. According to some embodiments, GUI 700 may illustrate the percentage of completed and failed tasks 710. The display of the percentage of completed and failed tasks 710 may be calculated and displayed per a desired period, e.g., per day, per several days, per week, per month, etc.

In the example illustrated by FIG. 7, under section 710, the percentage of completed tasks 712 may be 50%, and the percentage of failed tasks may be 50%, while the percentage of failed tasks may be divided into two or more types of failures, e.g., business type failures 714, and technical type failures 716. The percentage of completed and failed tasks may be calculated per the total tasks that are attempted to be completed per the desired period.

In some embodiments, a business type failure may occur due to a decision on change in the process that was not translated to an actual change in the path according to which the robotic process automation unit 104 processes tasks of the same nature. In some embodiments, a technical type failure may occur due to changes in the windows onto which the actions for completing a task are performed, for example due to changes in the active screen elements that appear on the window onto which actions for completing a task are performed.

In some embodiments, GUI 700 may illustrate the status of active tasks 720. The display of active tasks 720 may illustrate the processed tasks 722, which may indicate the number of tasks being processed. Typically, the processed tasks may be processed by robotic process automation unit 104, though the total number of processed tasks 722 may also include the tasks processed by evaluators unit 108. The display of active tasks 720 may further illustrate the queued tasks 724, which may indicate the number of tasks being queued, typically by tasks queue database 102.

In some embodiments, GUI 700 may be displayed onto a display unit, which may be part of system 100. Display of the status of processes may be done via an 'Automation Portal', which may be a display in connection with robotic process control unit 112.

In the context of some embodiments of the present disclosure, by way of example and without limiting, terms such as 'operating' or 'executing' imply also capabilities, such as 'operable' or 'executable', respectively.

Conjugated terms such as, by way of example, 'a thing property' implies a property of the thing, unless otherwise clearly evident from the context thereof.

The terms 'processor' or 'computer', or system thereof, are used herein as ordinary context of the art, such as a general purpose processor, or a portable device such as a smart phone or a tablet computer, or a micro-processor, or a RISC processor, or a DSP, possibly comprising additional elements such as memory or communication ports. Optionally or additionally, the terms 'processor' or 'computer' or derivatives thereof denote an apparatus that is capable of carrying out a provided or an incorporated program and/or is capable of controlling and/or accessing data storage apparatus and/or other apparatus such as input and output ports. The terms 'processor' or 'computer' denote also a plurality of processors or computers connected, and/or linked and/or otherwise communicating, possibly sharing one or more other resources such as a memory.

The terms 'software', 'program', 'software procedure' or 'procedure' or 'software code' or 'code' or 'application' may be used interchangeably according to the context thereof, and denote one or more instructions or directives or electronic circuitry for performing a sequence of operations that generally represent an algorithm and/or other process or method. The program is stored in or on a medium such as RAM, ROM, or disk, or embedded in a circuitry accessible and executable by an apparatus such as a processor or other circuitry. The processor and program may constitute the same apparatus, at least partially, such as an array of electronic gates, such as FPGA or ASIC, designed to perform a programmed sequence of operations, optionally comprising or linked with a processor or other circuitry.

The term 'configuring' and/or 'adapting' for an objective, or a variation thereof, implies using at least a software and/or electronic circuit and/or auxiliary apparatus designed and/or implemented and/or operable or operative to achieve the objective.

A device storing and/or comprising a program and/or data constitutes an article of manufacture. Unless otherwise specified, the program and/or data are stored in or on a non-transitory medium.

In case electrical or electronic equipment is disclosed it is assumed that an appropriate power supply is used for the operation thereof.

The flowchart and block diagrams illustrate architecture, functionality or an operation of possible implementations of systems, methods and computer program products according to various embodiments of the present disclosed subject matter. In this regard, each block in the flowchart or block diagrams may represent a module, segment, or portion of program code, which comprises one or more executable instructions for implementing the specified logical function(s). It should also be noted that, in some alternative implementations, illustrated or described operations may occur in a different order or in combination or as concurrent operations instead of sequential operations to achieve the same or equivalent effect.

The corresponding structures, materials, acts, and equivalents of all means or step plus function elements in the claims below are intended to include any structure, material, or act for performing the function in combination with other claimed elements as specifically claimed. As used herein, the singular forms "a", "an" and "the" are intended to include the plural forms as well, unless the context clearly indicates otherwise. It will be further understood that the terms "comprising", "including" and/or "having" and other conjugations of these terms, when used in this specification, specify the presence of stated features, integers, steps, operations, elements, and/or components, but do not preclude the presence or addition of one or more other features, integers, steps, operations, elements, components, and/or groups thereof.

The terminology used herein should not be understood as limiting, unless otherwise specified, and is for the purpose of describing particular embodiments only and is not intended to be limiting of the disclosed subject matter. While certain embodiments of the disclosed subject matter have been illustrated and described, it will be clear that the disclosure is not limited to the embodiments described herein. Numerous modifications, changes, variations, substitutions and equivalents are not precluded.

The invention claimed is:

1. A system, in a call center, for detecting and fixing robotic process automation failures in a robotic process automation unit that is imitating human representative's actions by performing tasks on applications which are running on a client computerized device instead of the human representative, said system comprising:

a task queue database configured to collect and store tasks from at least one client computerized device via one or more applications that are installed thereon, wherein a task is comprised of two or more executed steps;

a robotic process automation unit configured to pull tasks from the task queue database for replacing a human representative by processing said tasks;

a failed tasks queue database configured to collect and store tasks and data on tasks, per task type, that the robotic process automation unit failed to accomplish, due to a change in the executed steps of said tasks;

a failure evaluation processor configured to collect said failed tasks, per task type and to receive recordings of successful execution steps per each of the failed tasks; and a real-time database configured to store data on recorded successfully executed steps of completed tasks by the robotic process automation unit, wherein the failure evaluation processor is further configured to evaluate the recorded successful execution steps with respect to the failed task types in order to provide selected execution steps that best fix the tasks that the robotic process automation unit failed to accomplish, wherein the selected execution steps are provided according to an assigned commonality score to at least one pair of succeeding steps which are above a predefined threshold, thereby fixing the robotic process automation failures, and wherein the data on successfully completed tasks comprises robotic process automation workflows per task type.

2. The system according to claim 1, wherein the failure evaluation processor is configured to compare execution steps of the same task types.

3. The system according to claim 2, wherein the failure evaluation processor is further configured to aggregate the execution steps of the same task types in order to calculate percentage of commonalities between the execution steps per type of task.

4. The system according to claim 1, wherein the system further comprises a robotic process control unit configured to receive data from the failure evaluation processor, which receives data from the robotic process automation unit and from the failed tasks queue database.

5. The system according to claim 4, wherein the robotic process control unit is further configured to provide data on number of active tasks and number of processed tasks.

6. The system according to claim 5, wherein said robotic process control unit is further configured to provide data on percentage of completed tasks, and percentage of filed tasks.

7. The system according to claim 1, wherein an assigned commonality score above a predefined threshold for a pair of succeeding steps indicates that the pair of succeeding steps appeared in a predefined amount of successful execution steps, per failed task type.

8. The system according to claim 1, wherein the two or more executed steps comprising: a step ID, and wherein said step ID comprising: (i) a step name; (ii) a step description; (iii) an action performed by the step; (iv) window details onto which said action is performed.

9. The system according to claim 8, wherein said window details include at least one of: a caption and a URL.

10. The system according to claim 8, wherein said action comprising at least one of: 'click', 'copy', 'paste' and 'set text'.

11. A method, in a call center, for detecting and fixing robotic process automation failures in a robotic process automation unit that is imitating human representative's actions by performing tasks on applications which are running on a client computerized device instead of the human representative, said method comprising:

collecting and storing tasks from at least one client computerized device, via one or more applications that are installed thereon, wherein a task is comprised of two or more executed steps:

replacing a human representative by processing said tasks instead of a human representative via robotic process automation;

collecting and storing tasks and data on tasks per task type that the robotic process automation unit failed to accomplish due to a change in the executed steps of said tasks;

recording and storing successful execution steps of completed tasks, per each of the failed tasks;

evaluating the recorded successful execution steps of completed tasks, with respect to the failed task types, providing selected execution steps that best fix the failed tasks, that the robotic process automation unit failed to accomplish, wherein the selected execution steps are provided according to an assigned commonality score to at least one pair of succeeding steps which are above a predefined threshold, thereby fixing the robotic process automation failures; and wherein the data on successfully completed tasks comprises robotic process automation workflows per task type.

12. The method according to claim 11, further comprising comparing successful execution steps of the same task types.

13. The method according to claim 11, further comprising calculating percentage of commonalities between the execution steps per each type of task.

14. The method according to claim 11, further comprising providing data on number of active tasks and number of processed tasks.

15. The method according to claim 11, further comprising providing data on percentage of completed tasks, and percentage of failed tasks.

16. The method according to claim 11, wherein an assigned commonality score above a predefined threshold for a pair of succeeding steps indicates that the pair of succeeding steps appeared in a predefined amount of successful execution steps, per failed task type.

17. The method according to claim 11, wherein the two or more executed steps comprising: a step ID, and wherein said step ID comprising: (i) a step name; (ii) a step description; (iii) an action performed by the step; (iv) window details onto which said action is perforated.

18. The method according to claim 17, wherein said window details include at least one of: a caption and a URL.

19. The method according to claim 17, wherein said action comprising at least one of: 'click', 'copy', 'paste' and 'set text'.

* * * * *